(12) United States Patent
Zhu et al.

(10) Patent No.: US 9,182,938 B2
(45) Date of Patent: Nov. 10, 2015

(54) METHOD FOR CONTROLLING MULTIPLE DISPLAYS AND SYSTEM THEREOF

(75) Inventors: Yi-Fei Zhu, Shanghai (CN); Guo-Feng Zhang, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 449 days.

(21) Appl. No.: 13/530,087

(22) Filed: Jun. 21, 2012

(65) Prior Publication Data

US 2013/0002688 A1 Jan. 3, 2013

(30) Foreign Application Priority Data

Jun. 30, 2011 (CN) .......................... 2011 1 0182317
Dec. 1, 2011 (CN) .......................... 2011 1 0393483

(51) Int. Cl.
*G06F 3/14* (2006.01)
*G09G 5/14* (2006.01)

(52) U.S. Cl.
CPC ................ *G06F 3/1446* (2013.01); *G09G 5/14* (2013.01); *G09G 2310/04* (2013.01); *G09G 2360/06* (2013.01); *G09G 2360/08* (2013.01)

(58) Field of Classification Search
CPC ... G06T 15/005; G06F 3/1423; G06F 3/1438; G09G 2352/00
USPC .................................. 345/502, 503, 505, 1.1
See application file for complete search history.

(56) References Cited

U.S. PATENT DOCUMENTS

| | | | | |
|---|---|---|---|---|
| 5,864,342 A | * | 1/1999 | Kajiya et al. .................. | 345/418 |
| 5,963,210 A | * | 10/1999 | Lewis et al. ................... | 345/419 |
| 6,577,305 B1 | * | 6/2003 | Duluk et al. .................. | 345/419 |
| 6,795,081 B2 | * | 9/2004 | Lavelle et al. ................ | 345/557 |
| 6,980,216 B2 | * | 12/2005 | Hancock et al. .............. | 345/501 |
| 6,982,682 B1 | * | 1/2006 | Kaulgud et al. .............. | 345/1.1 |
| 7,075,541 B2 | * | 7/2006 | Diard ............................ | 345/505 |
| 7,170,526 B1 | * | 1/2007 | Johnson ........................ | 345/582 |
| 7,340,547 B1 | * | 3/2008 | Ledebohm .................... | 710/260 |

(Continued)

FOREIGN PATENT DOCUMENTS

| | | |
|---|---|---|
| CN | 101236485 | 8/2008 |
| CN | 102096572 | 6/2011 |

(Continued)

OTHER PUBLICATIONS

"Office Action of Taiwan Counterpart Application", issued on Jul. 3, 2014, p. 1-p. 12, in which the listed references were cited.

*Primary Examiner* — Maurice L McDowell, Jr.
(74) *Attorney, Agent, or Firm* — Jianq Chyun IP Office

(57) ABSTRACT

A method and system for controlling multiple displays is provided. The disclosed method is used to control a plurality of graphics processing units (GPUs), wherein every GPU controls one or more displays. The method includes the following steps: providing a graphical interface the same to a graphical program library of an operating system to replace the graphical program library to receive a drawing command from an application program; determining a display set of the GPUs according to a display region of the application program, wherein a frame displayed by the display controlled by each GPU is intersected to the display region; and delivering coordinate-transformed drawing commands to the GPUs in the display set according to the display intersection region, wherein each GPU in the display set only draws the content of the corresponding display intersection region.

16 Claims, 6 Drawing Sheets

(56) References Cited

U.S. PATENT DOCUMENTS

| | | | |
|---|---|---|---|
| 7,528,839 B1 * | 5/2009 | Cunniff et al. | 345/553 |
| 7,796,135 B1 | 9/2010 | Diard et al. | |
| 8,363,067 B1 * | 1/2013 | Massicotte et al. | 345/642 |
| 8,537,166 B1 * | 9/2013 | Diard et al. | 345/502 |
| 2005/0237329 A1 * | 10/2005 | Rubinstein et al. | 345/531 |
| 2006/0114260 A1 | 6/2006 | Diard | |
| 2007/0279411 A1 * | 12/2007 | Bakalash et al. | 345/419 |
| 2008/0284798 A1 * | 11/2008 | Weybrew et al. | 345/630 |
| 2009/0128573 A1 * | 5/2009 | Lambe et al. | 345/530 |
| 2010/0013757 A1 * | 1/2010 | Ogikubo | 345/156 |
| 2011/0157193 A1 * | 6/2011 | Boucher et al. | 345/505 |

FOREIGN PATENT DOCUMENTS

| | | |
|---|---|---|
| TW | 531733 | 5/2003 |
| TW | 569123 | 1/2004 |
| TW | 200501046 | 1/2005 |

* cited by examiner

METHOD FOR CONTROLLING MULTIPLE DISPLAYS AND SYSTEM THEREOF

CROSS-REFERENCE TO RELATED APPLICATION

This application claims the priority benefits of China application serial no. 201110182317.8, filed on Jun. 30, 2011, and China application serial no. 201110393483.2, filed on Dec. 1, 2011. The entirety of each of the above-mentioned patent applications is hereby incorporated by reference herein and made a part of specification.

BACKGROUND

1. Technical Field

The invention relates to a method for controlling a display and a system thereof. Particularly, the invention relates to a method for controlling multiple displays and a system thereof.

2. Related Art

Many techniques related to multiple displays have been developed, for example, a multiple output adapter is used to expand the number of displays, a plurality of computers are used to drive a plurality of displays, a display function is used to provide one video source to a plurality of displays, or an external switch is used to combine a plurality of displays into a display wall. The above techniques have their own advantages and disadvantages, in overall, implementation of the aforementioned techniques is generally over complex, expensive or is lack of capability for supporting high-resolution images, and most important one is lack of capability for supporting a three-dimensional (3D) image display technique, for example, a direct3D runtime library of Microsoft Corporation.

The 3D image display technique, for example, Direct3D including Direct3D image application or DirectShow video application, etc., all requires to use a Direct3D program library to process image contents. However, the current Direct3D program library only uses one display in logic, i.e. if a window of one application program is displayed on a plurality of displays, even if the multiple displays are controlled by a plurality of graphics processing units (GPUs), Current D3D program creates only one instance of Direct3D device, and one instance of Direct3D device can only process and draw an image through one of the GPUs, and then Windows operation system will copy the drawn Direct3D image to each of the other GPUs for displaying according to a display position through the GPU. Since the copy operation is executed by the operating system, and is not accelerated by the GPU, a processing speed thereof is very slow.

Moreover, compared to establishment of a general 2D image content, computation complexity in establishment of the 3D image data display content is higher, so that a display control system (for example, a computer system) may consume more time to process and display the image. Therefore, if the 3D image is drawn by one GPU and is then copied to other GPUs according to the conventional technique, in the time-consuming image processing process, the processing process is further prolonged due to the copy operation, and such processing method severely influences the image display efficiency. Therefore, while considering the cost, how to quickly establish the display content of the 3D image data and display it on the multiple displays has become a major problem to be resolved.

SUMMARY

The invention provides a method for controlling multiple displays, which is adapted to control a plurality of graphics processing units (GPUs) to simultaneously draw a display frame, where each of the GPUs controls at least one display. The method for controlling multiple displays includes the following steps: providing a graphical interface the same to a graphical program library of an operating system to replace the program library to receive a drawing command from an application program; determining a display set of the GPUs according to a display region of the application program, wherein a frame displayed by the display controlled by each of the GPUs in the display set is intersected to the display region; performing coordinate transform on the drawing command to generate at least one coordinate-transformed drawing command according to a display intersection region between the display region and the frame displayed by the display controlled by each of the GPUs in the display set; and delivering the coordinate-transformed drawing command to the corresponding GPU in the display set, so that each GPU in the display set only draws a content of the corresponding display intersection region.

The invention provides a multi-display control system, which is adapted to control a plurality of graphics processing units (GPUs) to simultaneously draw a display frame, where each of the GPUs controls at least one display. The multi-display control system includes a memory and a controller. The controller provides a graphical interface the same to a graphical program library of an operating system, and uses the graphical interface to receive a drawing command from an application program. The controller determines a display set of the GPUs according to a display region of the application program, wherein a frame displayed by the display controlled by each of the GPUs in the display set is intersected to the display region. The controller performs coordinate transform on the drawing command to generate at least one coordinate-transformed drawing command according to a display intersection region between the display region and the frame displayed by the display controlled by each of the GPUs in the display set, and delivers the coordinate-transformed drawing command to the corresponding GPU in the display set. The controller also records the display set and the display intersection region in the memory.

The invention provides a method for controlling multiple displays, which is adapted to control a plurality of graphics processing units (GPUs) to simultaneously draw a display frame, where each of the GPUs controls at least one display. The method for controlling multiple displays includes the following steps: determining a display set of the GPUs according to a display region of an application program, wherein a frame displayed by the display controlled by each of the GPUs in the display set is intersected to the display region of the application program; performing coordinate transform on a drawing command to generate at least one coordinate-transformed drawing command according to a display region of the display controlled by each of the GPUs in the display set; and delivering the coordinate-transformed drawing command to the corresponding GPU in the display set, so that each GPU in the display set only draws a content of the corresponding display intersection region.

According to the above descriptions, the drawing command is received from the application program, and the coordinate transform is performed according to the frame displayed by the display controlled by each of the GPUs, and then the coordinate-transformed drawing command is delivered to the corresponding GPU in the display set, so that the GPUs can respectively process image contents of the display intersection regions, and then display the image contents on the multiple displays, by which the time required for displaying an image on the multiple displays is shortened.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
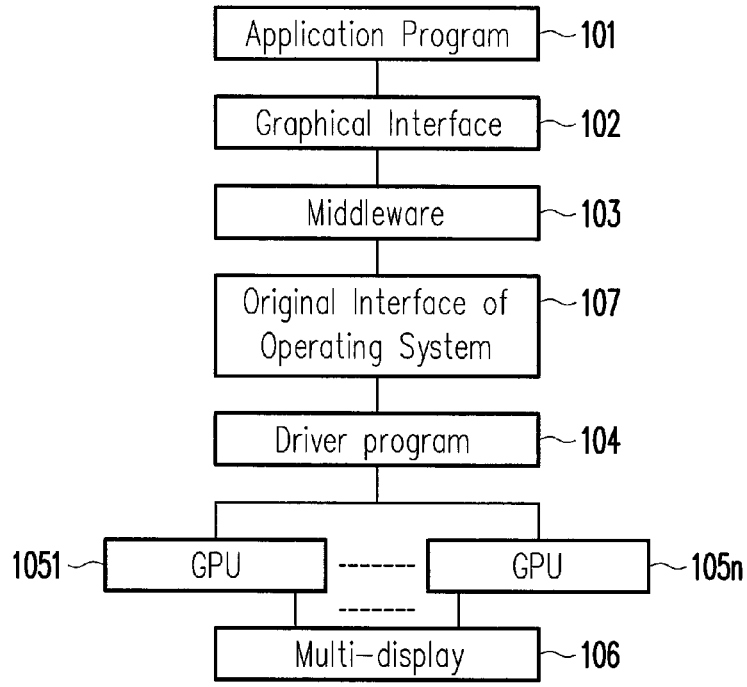
FIG. 1 is a schematic diagram of a multi-display control system according to an embodiment of the invention.

FIG. 1 is a schematic diagram of a multi-display control system according to an embodiment of the invention. Referring to FIG. 1, an application program 101 sends a drawing command, and transmits the drawing command to a graphical interface 102. The graphical interface 102 receives the drawing command from the application program 101 and transmits it to a middleware 103. The application program 101, the middleware 103 and a driver program are all executed in an operating system, and graphical interface 102 provided by the middleware 103 is the same to a graphical interface of a graphical program library of the operating system, so that the middleware 103 can replace the graphical program library to receive the drawing command of the application program 101, and the application program does not feed existence of the middleware 103.

In an embodiment, the graphical interface 102 intercepts the drawing command of the application program 101, and then the middleware 103 performs coordinate transform on the intercepted drawing command to transform coordinates of the drawing command corresponding to a whole display area into display coordinates of each of the displays controlled by each of graphics processing units (GPUs), and then delivers the coordinate-transformed drawing command to the corresponding GPU to implement image or graphics drawing processing without implementing the same though processing of the graphical program library. Moreover, the aforementioned operating system can be the Windows operating system of Microsoft Corporation, and the aforementioned graphical program library can be Direct3D program library or OpenGL, though the invention is not limited thereto. In other embodiments, a similar operating system and graphical program library can be used to respectively replace the Windows operating system and the Direct3D program library. It should be noticed that the current Direct3D program library can only recognize one display and one GPU in logic, i.e. can only draw a complete display frame on one GPU, and then the operating system copies the display frame to the other GPUs for displaying. Since the copy operation of the operating system is very slow, the display effect is influenced. Comparatively, according to the design of the middleware 103 of the present invention, a plurality of displays can be simultaneously recognized, and a plurality of GPUs of the displays can be simultaneously controlled, and the middleware 103 can deliver the coordinate-transformed drawing commands to each of the GPUs. Therefore, under control of the middleware 103, a plurality of the CPUs can simultaneously draw the display frame. Therefore, in the method for controlling multiple displays of the invention, the graphical interface 102 and the middleware 103 are designed to replace the Direct3D program library to receive the drawing commands of the application program 101, and in collaboration with a multiplexing processing method, image processing is accelerated to reduce the burden of a single GPU. On the other hand, when the graphical interface 102 and the middleware 103 are used to replace the Direct3D program library to receive the drawing commands of the application program 101, the application program 101 does not feel existence of the middleware 103, i.e. according to the invention, operations of the GPUs can be directly controlled without changing the operating system and driver programs.

Referring to FIG. 1, the middleware 103 is coupled to the graphical interface 102 to receive the drawing commands transmitted through the graphical interface 102, and performs coordinate transform on the drawing commands that originally implement the drawing operations in the whole display area, so as to generate the coordinate-transformed drawing commands corresponding to individual GPUs, and then calls a driver program 104 through an operating system original interface 107 to deliver the coordinate-transformed drawing commands to GPUs 1051-105n, and the operation of delivering the coordinate-transformed drawing commands is described in detail later. It should be noticed that in an embodiment, beside transforming the display coordinates of the whole display area into coordinates of the displays controlled by the individual GPUs, the middleware 103 further records resources created by the application program and states thereof, for example, process and record of the aforementioned coordinate transform, and resources required by the coordinate-transformed drawing command corresponding to the individual GPU and positions of the resources. The resources may include but are not limited to vertex buffer of Direct3D, index buffer, vertex shader, pixel shader and texture pattern, etc., and the aforementioned states may include but are not limited to Direct3D, a rasterization state, a texture mixing state, a depth and stencil state and an output mixing state, etc. Moreover, details of delivering the corresponding coordinate-transformed drawing command according to the content displayed by the individual GPU are described with reference of FIG. 3A, FIG. 3B, FIG. 7, FIG. 8A and FIG. 8B. Moreover, in an embodiment, the operating system original interface 107 is an application programming interface (API)

provided to the application program by the operating system for calling the driver program. The API is originally provided to the graphical program library that is replaced by the middleware 103 for calling the driver program 104, and since the graphical program library has been replaced by the middleware 103, the middleware 103 also calls the driver program 104 through such API.

The driver program 104 is respectively coupled to the operating system original interface 107 and the GPUs 1051-105n, and after the middleware 103 receives the coordinate-transformed drawing commands, the driver program 104 interprets these coordinate-transformed drawing commands into interpreted drawing commands that can be recognized by the GPUs, and then the translated drawing commands are delivered to the corresponding GPUs 1051-105n. The driver program is a communication bridge between the computer operating system and hardware, which is used to interpret the drawing commands transmitted by the operating system into commands (i.e. the aforementioned interpreted drawing commands) that can be recognized by the GPUs, and this part is well known by those skilled in the art, so that details thereof are not repeated. The GPUs 1051-105n are coupled to the driver program 104 to receive the interpreted drawing commands interpreted by the driver program 104, and control a multi-display device 106 according to the interpreted drawing commands. The multi-display device 106 is composed of a plurality of displays, and is coupled to the GPUs 1051-105n. Each of the GPUs 1051-105n can control one or a plurality of displays of the multi-display device 106, and draw an image or a graphic content to be displayed in display buffers of the displays according to the interpreted drawing command. Then, under control of the computer system, the contents of the display buffers are simultaneously displayed on the displays. Obviously, since the middleware 103 can send the coordinate-transformed drawing commands to the driver program 104 through the operating system original interface 107, and then delivers the interpreted drawing commands interpreted by the driver program to the GPUs 1051-105n, different to the conventional technique that the Direct3D image is only processed and drawn in a single GPU and is then copied to other GPUs for displaying according to the display positions, in the present invention, the data to be displayed is directly delivered to the individual GPUs through the driver program, so that a 3D image display speed is accelerated. Descriptions of the embodiment of the invention are described in detail later. It should be noticed that although the drawing commands of the whole display region probably generate at least one coordinate-transformed drawing command corresponding to the GPUs in a display set after the coordinate transform, after such transform, since the individual GPUs can perform graphics or image drawing operations in the respective display buffers according to instructions of the coordinate-transformed drawing commands, an image processing speed can be accelerated through a multiplexing method, so as to reduce a burden of a single GPU.

Figure 2:
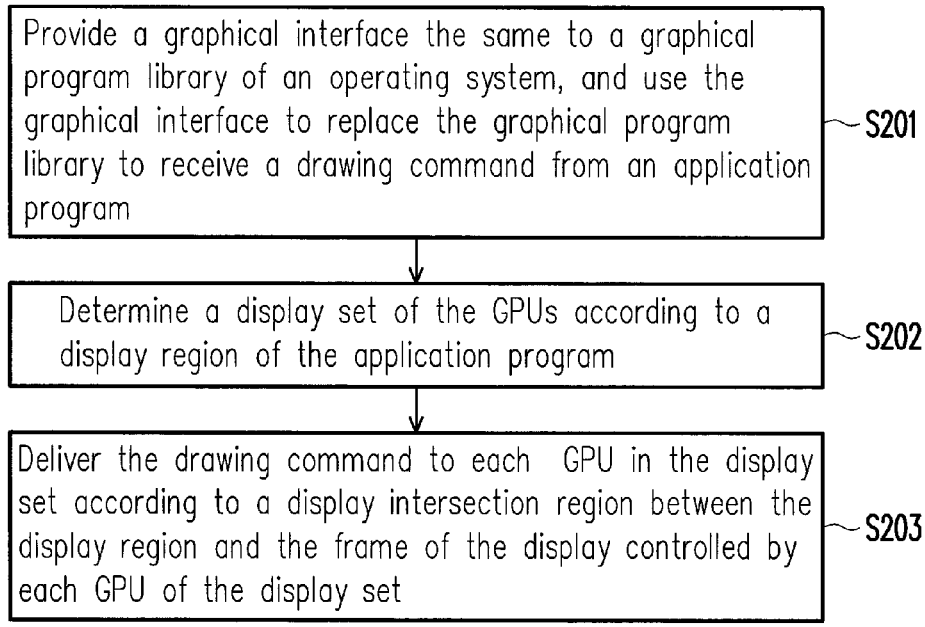
FIG. 2 is a flowchart illustrating a method for controlling multiple displays according to an embodiment of the invention.

FIG. 2 is a flowchart illustrating a method for controlling multiple displays according to an embodiment of the invention. The method for controlling multiple displays can be executed by the middleware 103. Referring to FIG. 2, in step S201, a graphical interface (for example, the graphical interface 102 of FIG. 1) the same to a certain program library of an operating system is provided, and is used to replace the program library to receive drawing commands from an application program, for example, the middleware 103 of FIG. 1 receives the drawing commands from the application program. Then, in step S202, a display set of a plurality of GPUs is determined according to a display region of the application program, where a frame displayed by the display controlled by each of the GPUs in the display set is intersected to the display region. In an embodiment, the display region is a window displayed by the application program on the frames of the displays, which can cross over a plurality of displays, and these displays commonly draw and display images or graphics according to instructions of the application commands. Then, in step S203, coordinate transform from the whole display region to individual displays is performed according to a display intersection region, so as to generate coordinate-transformed drawing commands corresponding to individual GPUs, and then the coordinate-transformed drawing commands are delivered to the corresponding GPUs in the display set. In this way, each of the GPUs in the display set draws within the respective display intersection region according to the instruction of the coordinate-transformed drawing command, for example, draws data of a pattern or an image, etc. to be displayed in the respectively display buffer, and then the computer system controls all of the GPUs in the display set to simultaneously display the contents of the respective display buffers, so as to implement display of the multi-display.

Figure 3A:
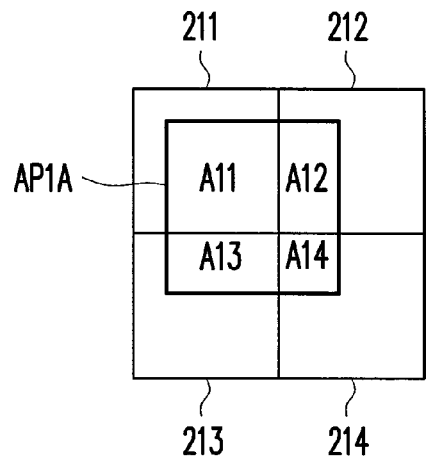
FIG. 3A and FIG. 3B are schematic diagrams respectively illustrating a relationship of a display region and display frames according to an embodiment of the invention.

FIG. 3A is a schematic diagram illustrating a relationship of a display region and display frames according to an embodiment of the invention. Referring to FIG. 3A, displays 211, 212, 213 and 214 in FIG. 3A are respectively controlled by four GPUs GP11, GP12, GP13 and GP14 (not shown). A display region AP1A represents a size and position of the window currently displayed by the application program, and since the display region AP1A is intersected to the frames of the displays 211, 212, 213 and 214, the display set of the present embodiment includes the GPUs GP11, GP12, GP13 and GP14. As shown in FIG. 3A, the intersection regions between the display region AP1A and the frames of the displays 211, 212, 213 and 214 are respectively display intersection regions A11, A12, A13 and A14, which respectively correspond to the displays 211, 212, 213 and 214, so that the GPUs GP11, GP12, GP13 and GP14 in the display set may receive the interpreted drawing commands (i.e. the drawing commands processed by coordinate transform and interpreted by the driver program) delivered by the driver program, and respectively process and draw display contents in the display intersection regions A11, A12, A13 and A14. The original whole display region (i.e. the display region AP1A) is divided into four display intersection regions A11, A12, A13 and A14 after the coordinate transform, and the corresponding GPUs GP11, GP12, GP13 and GP14 simultaneously perform the graphics/image drawing operation, which is different to the conventional technique that the drawing operation can only be performed in a single GPU.

Figure 3B:
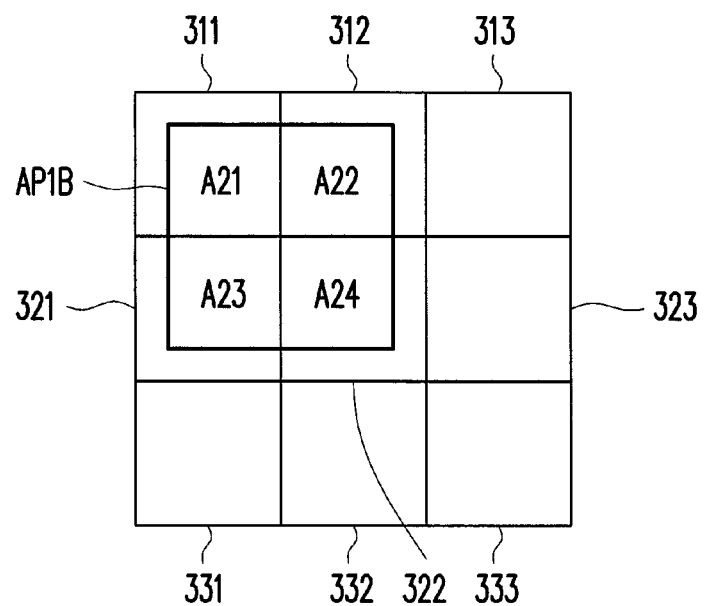

FIG. 3B is a schematic diagram illustrating a relationship of a current display region and display frames according to another embodiment of the invention. Referring to FIG. 3B, displays 311, 312 and 313 are controlled by a GPU GP21 (not shown), displays 321, 322 and 323 are controlled by a GPU GP22 (not shown), and displays 331, 332 and 333 are controlled by a GPU GP23 (not shown). As shown in FIG. 3B, a display region AP1B is intersected to frames of the displays 311, 312, 321 and 322, so that the display set of the present embodiment only includes the GPUs GP21 and GP22 that control the displays 311, 312, 321 and 322. Therefore, the GPUs GP21 and GP22 may receive the interpreted drawing commands (which are obtained by interpreting the coordinate-transformed drawing commands) delivered by the driver program, and respectively process and draw display contents in the display intersection regions A21, A22, A23 and A24. Similarly, the original whole display region (i.e. the display region AP1B) is divided into four display intersection regions A21, A22, A23 and A24 after the coordinate transform, and the corresponding GPUs GP21 (controlling the displays 311 and 312) and GP22 (controlling the displays 321 and 322) simultaneously perform the graphics/image drawing operation, for example, the GPU GP21 controls the display 311 to only draw the content of the display intersection region A21, which is different to the conventional technique that the drawing operation can only be performed in a single GPU. It should be noticed that since the GPU GP31 is not in the display set, it does not receive the interpreted drawing command delivered by the driver program, and does not participate the multi-display operation of the display region AP1B. Moreover, although the GPU GP21 and GP22 are in the display set, since none display intersection region is generated between the display region AP1B and the display 313 controlled by the GPU GP21 and the display 323 controlled by the GPU GP22, even if the GPUs GP21 and GP22 receive the interpreted drawing commands delivered by the driver program, the GPUs GP21 and GP22 only control the displays 311/312 and displays 321/322 to perform the multi-displaying operation, and the displays 313 and 323 do not participate the multi-display operation of the display region AP1B.

Figure 4:
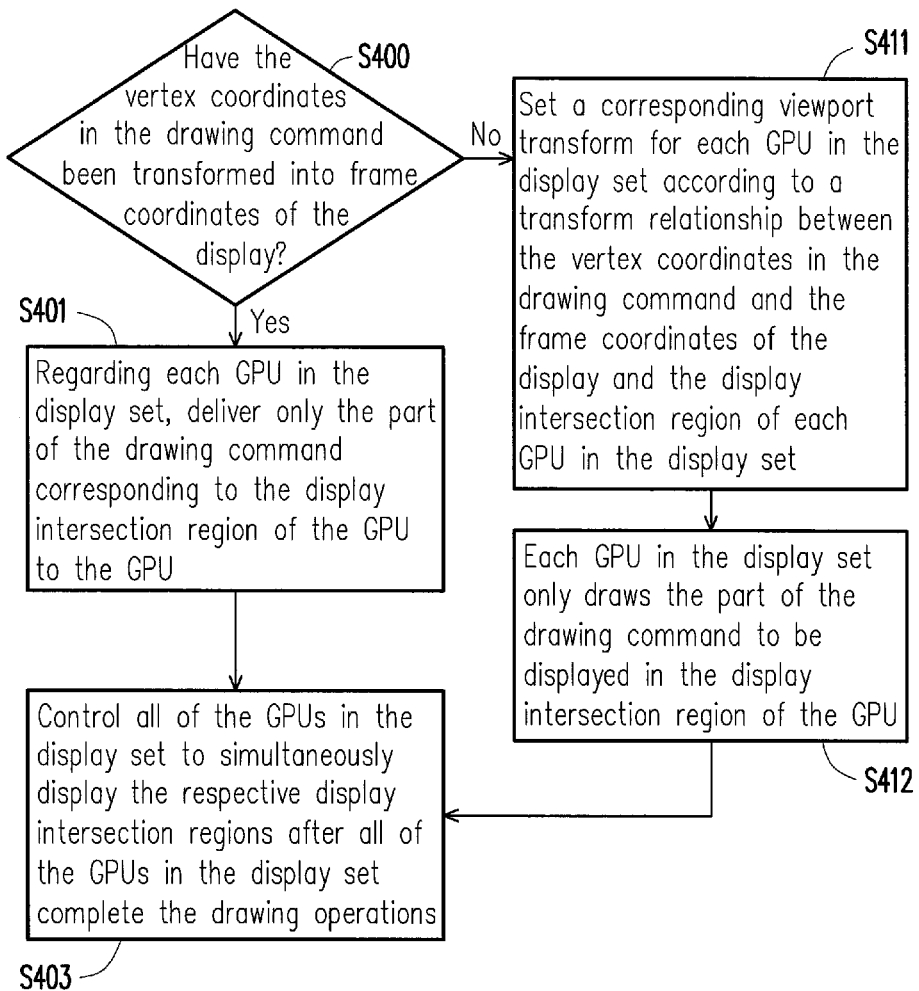
FIG. 4 is a flowchart illustrating steps of delivering a drawing command to each graphics processing unit (GPU) of a display set according to an embodiment of the invention.

FIG. 4 is a flowchart illustrating steps of delivering a drawing command to each of the GPUs of the display set according to an embodiment of the invention. Referring to FIG. 4, since the image to be displayed is probably a 3D image, in step S400, it is first determined whether vertex coordinates in the drawing command have been transformed into frame coordinates of the display. Then, in step S401, the coordinates of the whole display region are transformed into coordinates of the displays controlled by the individual GPUs, so as to generate the coordinate-transformed drawing commands, and then in allusion to each of the GPUs in the display set, the corresponding coordinate-transformed drawing commands are only delivered corresponding to the display intersection regions, so that each GPU in the display set only draws a content of the corresponding display intersection region. For example, the GPU GP11 of FIG. 3A only draws a content of the display intersection region A11, and the GPU GP22 of FIG. 3B only draws contents of the display intersection regions A23 and A24. Then, in step S403, each of the GPUs in the display set respectively draws a specified content, for example, draws a pattern or an image instructed by the coordinate-transformed drawing command in the respective display buffer, and after all of the GPUs in the display set complete the drawing operations, the computer system controls all of the GPUs in the display set to simultaneously display the respective display intersection regions, i.e. control all of the GPUs in the display set to simultaneously display the contents of the display buffers of the displays controlled by the GPUs.

Referring to FIG. 4 again, in the step S400, if it is determined that the vertex coordinates in the drawing command are still not transformed into the frame coordinates of the display, in step S411, a corresponding viewport transform is set for each of the GPUs in the display set according to a transform relationship between the vertex coordinates in the drawing command and the frame coordinates of the display and the display intersection region of each GPU in the display set. The viewport transform is one of the functions of Direct3D. Setting of the viewport transform is equivalent to setting a visual range of each GPU observable in a 3D vector space containing the aforementioned vertices. The vertex coordinates can be a vector form, and the frame coordinates on the display can be directly obtained through computation of the viewport transform. In the step S411, since the transformed coordinates are the display coordinates of the application program on the multiple displays, in step S412, according to the aforementioned setting of the viewport transform, the display coordinates of the whole display region (i.e. the display region on the multiple displays) are transformed into the coordinates on the displays controlled by the individual GPUs, so as to generate the coordinate-transformed drawing commands corresponding to the individual GPS, and then the driver program interprets the coordinate-transformed drawing commands to generate the interpreted drawing commands, and transmits the interpreted drawing commands to the corresponding GPUs for drawing operations. Therefore, each GPU in the display set only draws a content of the corresponding display intersection region. In step S403, each of to GPUs draws the display content specified by the respective interpreted drawing command, for example, a pattern or an image required to be displayed is drawn in the respective display buffer, and after the drawing operation is completed, the computer system controls all of the GPUs in the display set to simultaneously display the respective display intersection regions.

Figure 5:
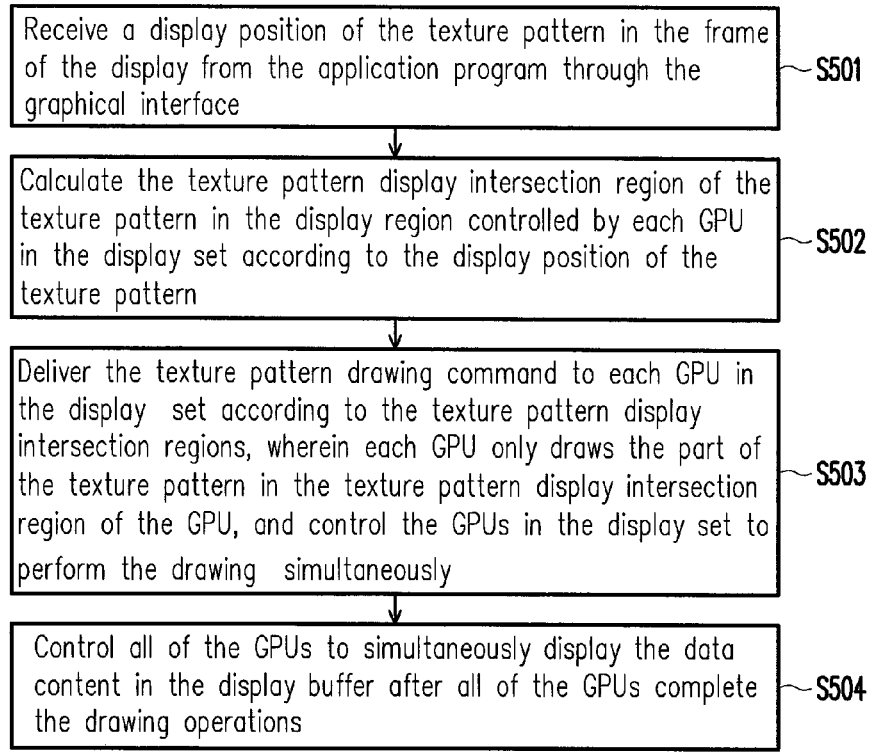
FIG. 5 is a flowchart illustrating steps of delivering a drawing command to each GPU of a display set according to an embodiment of the invention, where the drawing command includes drawing a texture pattern in a display region.

In the following embodiment, a processing method of a renderable texture pattern of the Direct3D is described. FIG. 5 is a flowchart illustrating steps of delivering renderable texture drawing commands to each of the GPUs in the display set according to an embodiment of the invention. After the vertex coordinates are determined, another focus of displaying a 3D object is to draw and display a texture pattern of a surface of the object, which is described below. Referring to FIG. 5, in step S501, the renderable texture drawing command is received from the application program through the graphical interface, and then extracts a display position of the texture pattern on the frame of the display from the renderable texture drawing command. It should be noticed that the graphical interface of the step S501 is not a standard the graphical interface of Direct3D, but is an extension function of the present embodiment, so that if the application program can provide the display position of the texture pattern on the frame of the display, the texture pattern to be displayed is coordinate-transformed and sliced for transmitting to the corresponding GPUs for drawing operations. Then, in step S502, according to the display position of the texture pattern, a texture pattern display intersection region of the texture pattern in the frame displayed by the displays controlled by each of the GPUs in the display set is calculated. It should be noticed that since the same texture pattern can be displayed by a plurality of different displays, if the slicing processing is not performed in allusion to the display position and content of the texture pattern, for example, the coordinates and the display content of the texture pattern in the displays controlled by each of the GPUs are not calculated, the whole texture pattern has to be transmitted to each of the related GPUs for processing, which is undoubtedly a waste of time and resource of the whole computer system. As the invention provides such function, the texture pattern can be coordinate-transformed and sliced for transmitting to the corresponding GPUs, such that wastes of the system resource can be avoided. Moreover, the texture pattern display intersection region refers to an intersection part between the display region of the texture pattern and the frame displayed on the display controlled by each of the GPUs in the display set, which is included in the display intersection region, and this part is described in detail later with reference of FIG. 7.

Referring to FIG. 5, after the texture pattern display intersection region is calculated, in step S503, according to the texture pattern display intersection region on the frame displayed on the display controlled by each of the GPUs in the display set, the whole display coordinates are transformed into the display coordinates of the displays controlled by the individual GPUs, and the renderable texture drawing commands are transformed into coordinate-transformed texture pattern drawing commands. The renderable texture pattern displayed in the whole display region has been sliced into a plurality parts according to the corresponding GPUs, and the related data (including the sliced texture patterns and the display coordinates) is all included in the coordinate-transformed texture pattern drawing commands, and then the coordinate-transformed texture pattern drawing commands are delivered to each of the GPUs in the display set, and each of the GPUs only draws a part of texture pattern on the frame displayed on the display controlled by such GPU, so as to achieve the multiplexing processing of the renderable texture pattern on the multiple displays. It should be noticed that the display controlled by the GPU in the display set may also have no texture pattern display intersection region, and the GPUs in the display set that control the displays having no texture pattern display intersection region do not participate drawing the renderable texture pattern and participate the multi-display operation. Finally, in step S504, after all of the GPUs complete the drawing operations, the computer system controls all of the GPUs that participate in the drawing operations to simultaneously display the data stored in the display buffers thereof. It should be noticed that in the display operation of the step S504, when the GPUs write the display data of the displays into the display buffers, the GPUs write the renderable texture pattern to be displayed into the display buffers all together, or otherwise a display time of the renderable texture pattern is probably incorrect. Moreover, since the GPUs in the display set perform the drawing operations in the corresponding display intersection regions, these drawing operations can be implemented according to one or a plurality of drawing commands, and drawing of the renderable texture pattern is only a part of the drawing operations.

Figure 6:
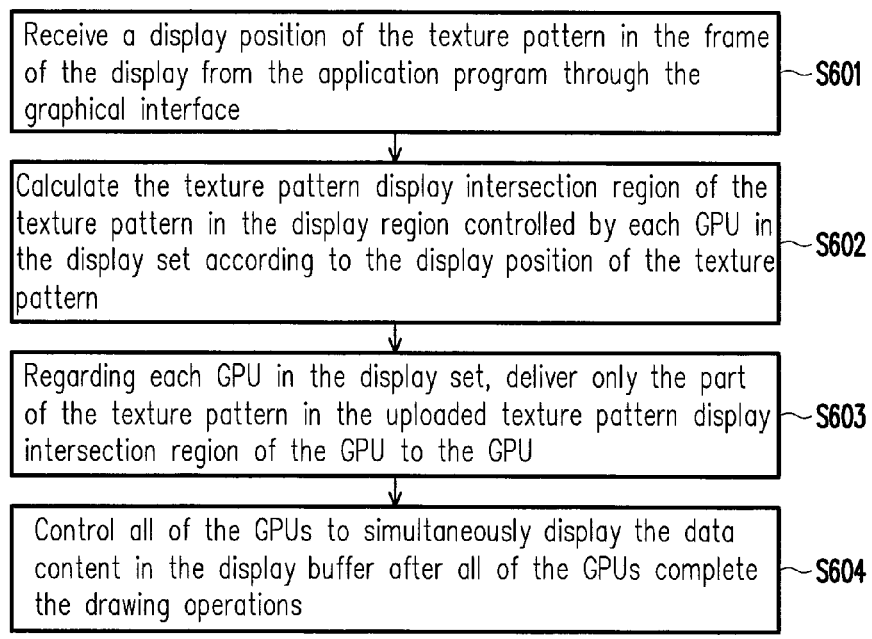
FIG. 6 is a flowchart illustrating steps of delivering a drawing command to each GPU of a display set according to an embodiment of the invention, where the drawing command includes a texture pattern in a display region.

In the following embodiment, a processing method of an uploaded texture pattern of the Direct3D is described. FIG. 6 is a flowchart illustrating steps of delivering uploaded texture pattern drawing commands to each of the GPUs in the display set according to an embodiment of the invention. The steps of the present embodiment are similar to the steps of the embodiment of FIG. 5, and a difference there between is that the uploaded texture pattern to be displayed of the present embodiment is directly provided by an uploaded texture pattern drawing command of the application program, and is not provided by the operating system. Steps S601 and S602 of FIG. 6 are respectively the same to the steps S501 and S502. In step S603, the whole display coordinates are transformed into the display coordinates of the displays controlled by the individual GPUs, and the uploaded texture pattern drawing commands are transformed into coordinate-transformed uploaded texture pattern drawing commands. Similarly, the uploaded texture pattern displayed in the whole display region has been sliced into a plurality parts according to the corresponding GPUs, and the related data (including the sliced uploaded texture patterns and the display coordinates) is all included in the coordinate-transformed uploaded texture pattern drawing commands, and then the coordinate-transformed uploaded texture pattern drawing commands are delivered to each of the GPUs in the display set, and the frame displayed by the display that is controlled by the GPU has the intersection region, and each of the GPUs only draws the intersection region of the uploaded texture pattern on the frame displayed on the display controlled by such GPU, so as to achieve the multiplexing processing of the uploaded texture pattern on the multiple displays. Then, in step S604, after all of the GPUs in the display set draw the texture pattern uploaded by the application program in the corresponding display buffers, the computer system controls all of the GPUs to simultaneously display data stored in the display buffers thereof. It should be noticed that the display operation of the step S604 is the same to that of the step S504, and when the GPUs write the display data of the displays into the display buffers, the GPUs write the uploaded texture pattern to be displayed into the display buffers all together, or otherwise a display time of the uploaded texture pattern is probably incorrect.

Figure 7:
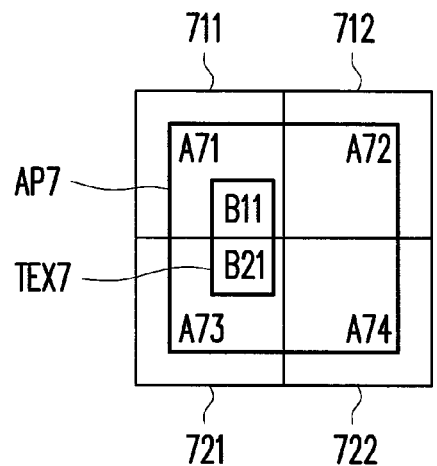
FIG. 7 is a schematic diagram illustrating an implementation of displaying a texture pattern of a display region on a display according to an embodiment of the invention.

FIG. 7 is a schematic diagram illustrating an implementation of displaying a texture pattern (the renderable texture pattern or the uploaded texture pattern) of the display region on the display according to an embodiment of the invention. Referring to FIG. 7, displays 711, 712, 721 and 722 are respectively controlled by GPUs GP71, GP72, GP73 and GP74 (not shown). A display region AP7 represents a display region of the application program and is respectively intersected to frames of the displays 711, 712, 721 and 722 to form display intersection regions A71, A72, A73 and A74, so that the display set consists of the GPUs GP71, GP72, GP73 and GP74. A texture pattern display region TEX6 represents a display position and a size of a texture pattern, and is intersected to frames of the displays 711 and 721 to form texture pattern display intersection regions B11 and B21. Then, when the texture pattern is to be drawn, a part of the drawing commands of the application program corresponding to the texture pattern display intersection regions B11 and B21 is coordinate-transformed and the texture pattern is sliced, and then coordinate-transformed texture pattern drawing commands (including the transformed coordinates and the sliced texture patterns) are transmitted to the GPUs GP71 and GP73 to control the GPUs GP71 and GP73 to respectively draw the texture patterns of the texture pattern display intersection regions B11 and B21. After all of the GPUs completes the drawing operations, the computer system controls the GPUs to simultaneously display the contents in the display buffers of the controlled displays, so that the texture pattern can be displayed through the multi-display method. If the texture pattern (i.e. the uploaded texture pattern) is provided by the application program, a part of the uploaded texture pattern corresponding to the texture pattern display intersection regions B11 and B21 is coordinate-transformed and the texture pattern is sliced, and then the coordinate-transformed uploaded texture pattern drawing commands (including the transformed coordinates and the sliced texture patterns) are transmitted to the GPUs GP71 and GP73, and the computer system controls the GPUs GP71 and GP73 to simultaneously display the contents in the display buffers of the controlled displays, so that the uploaded texture pattern can be simultaneously displayed on multiple displays. Obviously, the texture pattern display intersection regions B11 and B21 are included in the display intersection regions A71 and A73, so that only the GPUs GP71 and GP73 draw the texture patterns in the texture pattern display intersection regions B11 and B21, and the GPUs GP72 and GP74 do not draw the texture pattern.

Figure 8A:
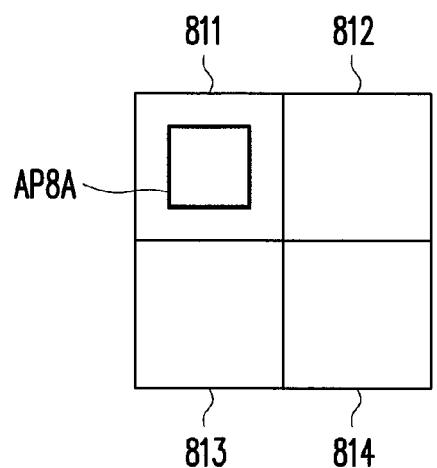
FIG. 8A and FIG. 8B are schematic diagrams illustrating an implementation of changing a display region of an application program according to an embodiment of the invention.
Figure 8B:
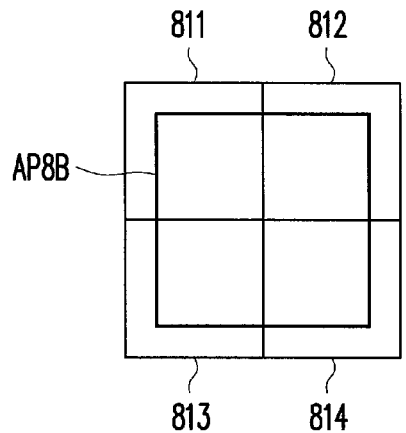

FIG. 8A and FIG. 8B are schematic diagrams illustrating an implementation of changing a display region of the application program according to an embodiment of the invention. Referring to FIG. 8A, displays 811, 812, 813 and 814 are respectively controlled by GPUs GP81, GP82, GP83 and GP84 (not shown). Since a display region AP8A is only intersected to the frame of the display 811, i.e. the display set only contains the GPU GP81, after the coordinate of the drawing command is transformed, it is only transmitted to the GPU GP81 for the drawing operation.

Then, referring to FIG. 8A and FIG. 8B, the display region of the application program is now enlarged from the display region AP8A of FIG. 8A to a display region AP8B of FIG. 8B, and the frames of the displays 812, 813 and 814 are also intersected to the display region AP8B, so that the GPUs GP82, GP83 and GP84 that control the displays 812, 813 and 814 are added to the display set. Since the GPUs GP82, GP83 and GP84 are newly added to the display set, in order to draw the display contents of the application program, the GPUs GP82, GP83 and GP84 must have the state and resource the same to that of the GPU GP81. Therefore, the middleware 103 individually sets the aforementioned recorded states for the newly added GPUs GP82, GP83 and GP84, and individually creates the aforementioned recorded resources for the newly added GPUs GP82, GP83 and GP84. Moreover, when the display region of the application program is changed, other GPUs are probably added to the aforementioned display set, and the middleware 103 also sets the sates and creates the resources for the newly added GPUs according to the same method. It should be noticed that when the middleware 103 delivers the drawing commands of the application program 101, the middleware 103 also records the states and the resources set and created for the GPUs of the aforementioned display set by the application program 101 according to the drawing commands. As described above, the resources may include but are not limited to vertex buffer of Direct3D, index buffer, vertex shader, pixel shader and texture pattern, etc., and the aforementioned states may include but are not limited to Direct3D, a rasterization state, a texture mixing state, a depth and stencil state and an output mixing state, etc.

Figure 9:
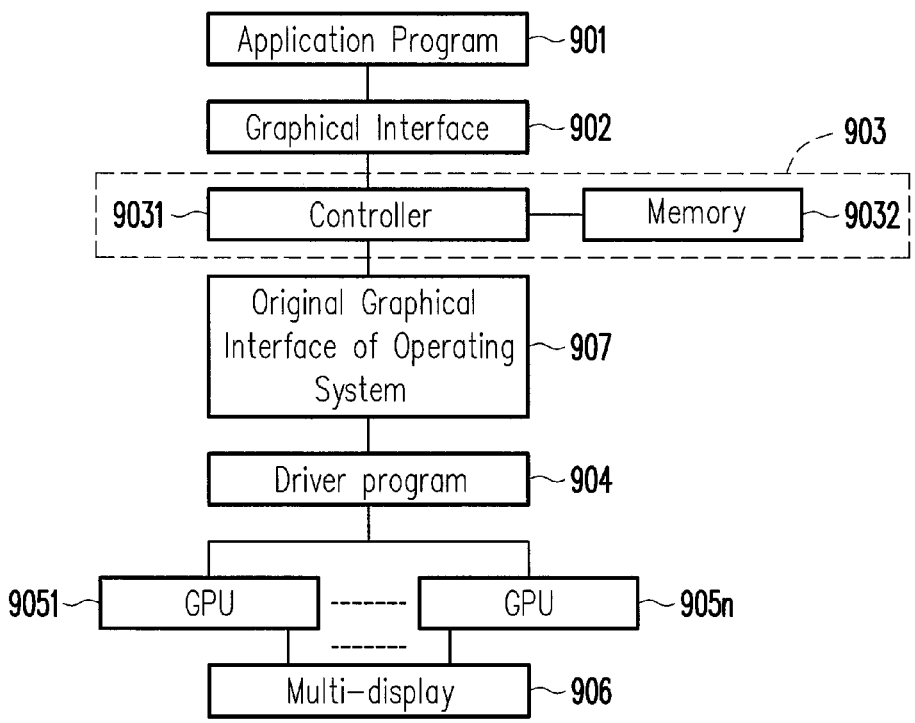
FIG. 9 is a schematic diagram of a multi-display control system according to an embodiment of the invention.

The invention also provides a multi-display control system, which is adapted to execute the aforementioned method for controlling multiple displays. FIG. 9 is a schematic diagram of a multi-display control system according to an embodiment of the invention. The embodiment of FIG. 9 is similar to FIG. 1, and a difference there between is that a multi-display control system 903 is used to replace the middleware 103, and the multi-display control system 903 can be independently fabricated as an integrated circuit (IC) or a circuit module, which is determined by those in the art according to an actual design requirement. The multi-display control system 903 includes a controller 9031 and a memory 9032, where the controller 9031 executes the methods for controlling multiple displays of the aforementioned embodiments, for example, the executes the steps shown in FIG. 2, FIG. 4, FIG. 5, and FIG. 6. In the process of executing the aforementioned methods, the controller 9031 can record data such as the display set of the step S202 (FIG. 2) and the display intersection regions of the GPUs of the step S203, etc. in the memory 9032, and can record the states and the resources set and created for the GPUs of the display set by the application program in the memory 9032 according to the drawing command of the application program.

In summary, the invention provides a method and a system for controlling multiple displays, by which when the image data, especially the 3D image content is to be displayed on the multiple displays, without using the current Direct3D program library, the image data content is coordinate-transformed and directly delivered to each of the GPUs controlling the displays by the driver program for drawing the display contents, and the display contents are simultaneously displayed under control of the computer system. In this way, not only the image processing speed is accelerated through a multiplexing method to reduce a burden of a single GPU, when the display region of the application program is enlarged or changed, the corresponding GPUs can be flexibly added for simultaneous computation.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for controlling multiple displays, adapted to control a plurality of graphics processing units to simultaneously draw a display frame, wherein each of the graphics processing units controls at least one display, the method for controlling multiple displays comprising:
providing a new graphical interface the same as an existing graphical program library of an operating system, wherein only one display frame and only one graphics processing unit are recognizable by the existing graphical program library of the operating system, and wherein multiple display frames and multiple graphics processing units are simultaneously recognizable by the new graphical interface;
intercepting a drawing command from an application program to the existing graphical program library through the new graphical interface;
determining a display set of the graphics processing units according to a display region of the application program, wherein a display region of the display controlled by each of the graphics processing units in the display set is intersected with the display region of the application program;
performing coordinate transform on the drawing command to generate a coordinate-transformed drawing command according to the display region of the display controlled by a corresponding graphics processing unit in the display set; and
delivering the coordinate-transformed drawing command to the corresponding graphics processing unit in the display set.

2. The method for controlling multiple displays as claimed in claim 1, wherein the display region of the application program is a window displayed by the application program through the multiple displays.

3. The method for controlling multiple displays as claimed in claim 1, wherein after each of the graphics processing units in the display set receives the corresponding coordinate-transformed drawing command, each of the graphics processing units in the display set only draws in a display intersection region between the display region of the display controlled by the graphics processing unit and the display region of the application program.

4. The method for controlling multiple displays as claimed in claim 3, further comprising simultaneously displaying the display intersection regions when all of the graphics processing units in the display set complete drawing the corresponding display intersection regions.

5. The method for controlling multiple displays as claimed in claim 1, further comprising performing a corresponding viewport transform for each of the graphics processing units in the display set to set a visual range of each of the graphics processing units in the display set observable in a three-dimensional vector space containing a vertex when a coordinate of the vertex of the drawing command is still not transformed into a frame coordinate of the display region of the application program before the coordinate-transformed drawing command is generated.

6. The method for controlling multiple displays as claimed in claim 1, wherein when the drawing command comprises drawing a texture pattern in the display region of the application program, the step of delivering the drawing command to each corresponding graphics processing unit in the display set comprises:
receiving a display position of the texture pattern in the display region from the application program by using the new graphical interface;
calculating a texture pattern display intersection region of the texture pattern in the display region of the display controlled by each of the graphics processing units in the display set according to the display position of the texture pattern in the display region;
performing coordinate transform on the drawing command according to the texture pattern display intersection region, so as to generate a coordinate-transformed texture pattern drawing command; and
delivering the coordinate-transformed texture pattern drawing command to the corresponding graphics processing unit in the display set.

7. The method for controlling multiple displays as claimed in claim 6, wherein each of the graphics processing units in the display set only draws the texture pattern display intersection region in the display region of the display controlled by the graphics processing unit according to the corresponding coordinate-transformed texture pattern drawing command.

8. The method for controlling multiple displays as claimed in claim 1, further comprising:
recording a state and a resource set and created by the application program for the graphics processing units in the display set according to the drawing command; and
when another graphics processing unit is newly added to the display set, setting the state and creating the resource for the newly added graphics processing unit.

9. A multi-display control system, adapted to control a plurality of graphics processing units to simultaneously draw a display frame, wherein each of the graphics processing units controls at least one display, the multi-display control system comprising:
a memory; and
a controller, providing a new graphical interface the same as an existing graphical program library of an operating system, wherein only one display frame and only one graphics processing unit are recognizable by the existing graphical program library of the operating system, and wherein multiple display frames and multiple graphics processing units are simultaneously recognizable by the new graphical interface;
wherein the controller intercepts a drawing command from an application program to the existing graphical program library through the new graphical interface,
wherein the controller determines a display set of the graphics processing units according to a display region of the application program, and a display region of the display controlled by each of the graphics processing units in the display set is intersected with the display region of the application program,
wherein the controller performs coordinate transform on the drawing command to generate at least one coordinate-transformed drawing command according to a display intersection region between the display region of the application program and the display region of the display controlled by each of the graphics processing units in the display set, and delivers the coordinate-transformed drawing command to a corresponding graphics processing unit in the display set, and
the controller records the display set and the display intersection regions in the memory.

10. The multi-display control system as claimed in claim 9, wherein the display region is a window displayed by the application program through the multiple displays.

11. The multi-display control system as claimed in claim 9, wherein the coordinate-transformed drawing command comprises coordinates used for drawing the display intersection region in the display region of the display controlled by each of the graphics processing units in the display set, and the controller delivers the coordinate-transformed drawing command to the corresponding graphics processing unit, such that the graphics processing unit only draws the display intersection region according to the coordinate-transformed drawing command.

12. The multi-display control system as claimed in claim 11, wherein after all of the graphics processing units in the display set complete the drawing operations, the controller controls all of the graphics processing units in the display set to simultaneously display the display intersection regions.

13. The multi-display control system as claimed in claim 9, wherein when a coordinate of a vertex of the drawing command is still not transformed into a frame coordinate of the display region of the application program before the coordinate-transformed drawing command is generated, the controller sets a corresponding viewport transform for each of the graphics processing units in the display set, so as to set a visual range of each of the graphics processing units in the display set observable in a three-dimensional vector space containing the vertex.

14. The multi-display control system as claimed in claim 9, wherein when the drawing command comprises drawing a texture pattern in the display region, the controller receives a position of the texture pattern in the display region of the display from the application program through the new graphical interface,
wherein the controller calculates a texture pattern display intersection region of the texture pattern in the display region of the display controlled by each of the graphics processing units in the display set according to the position of the texture pattern in the display region of the display,
wherein the controller performs coordinate transform on the drawing command according to the texture pattern display intersection region of the texture pattern, so as to generate a coordinate-transformed texture pattern drawing command, and delivers the coordinate-transformed texture pattern drawing command to the corresponding graphics processing unit in the display set, such that each of the graphics processing units in the display set only draws the texture pattern display intersection region of the texture pattern in the graphics processing unit.

15. The multi-display control system as claimed in claim 9, wherein the controller records a state and a resource set and created by the application program for the graphics processing units of the display set in the memory according to the drawing command.

16. The multi-display control system as claimed in claim 15, wherein when a graphics processing unit is newly added to the display set, the controller sets the state and creates the resource for the newly added graphics processing unit.

* * * * *